United States Patent
Petty, Sr. et al.

(10) Patent No.: US 10,451,276 B2
(45) Date of Patent: Oct. 22, 2019

(54) DUAL-WALL IMPINGEMENT, CONVECTION, EFFUSION COMBUSTOR TILE

(71) Applicants: Rolls-Royce Corporation, Indianapolis, IN (US); Rolls-Royce North American Technologies, Inc., Indianapolis, IN (US)

(72) Inventors: Jack D. Petty, Sr., Indianapolis, IN (US); Mohan Razdan, Indianapolis, IN (US); Michael S. Bell, Indianapolis, IN (US); Michel S. Smallwood, Greenwood, IN (US); Tab M. Heffernan, Plainfield, IN (US)

(73) Assignees: Rolls-Royce North American Technologies, Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 656 days.

(21) Appl. No.: 14/137,267

(22) Filed: Dec. 20, 2013

(65) Prior Publication Data

US 2014/0250894 A1  Sep. 11, 2014

Related U.S. Application Data

(60) Provisional application No. 61/773,082, filed on Mar. 5, 2013.

(51) Int. Cl.
  F23R 3/00 (2006.01)
  F23R 3/06 (2006.01)
  F23R 3/60 (2006.01)

(52) U.S. Cl.
  CPC .............. *F23R 3/002* (2013.01); *F23R 3/007* (2013.01); *F23R 3/06* (2013.01); *F23R 3/60* (2013.01);
  (Continued)

(58) Field of Classification Search
  CPC .... F23R 3/02; F23R 3/007; F23R 3/60; F23R 2900/0341; F23R 2900/03042;
  (Continued)

(56) References Cited

U.S. PATENT DOCUMENTS 4,296,606 A * 10/1981 Reider ................... F23R 3/002
                                                                    219/101
4,302,940 A * 12/1981 Meginnis ............... F23R 3/002
                                                                    416/231 A (Continued)

FOREIGN PATENT DOCUMENTS

EP    1635119 A2    3/2006

OTHER PUBLICATIONS

International Search report PCT/US2013/072931 dated Aug. 12, 2014.

*Primary Examiner* — Alain Chau
(74) *Attorney, Agent, or Firm* — Fishman Stewart PLLC

(57) ABSTRACT

A gas turbine engine includes a combustor having a dual-wall impingement convention effusion combustor tile assembly. The dual-wall tile assembly provides a cooling air flow channel and attachments for securing the tile to the cold skin liner of the combustor. Cooling is more efficient in part due to the dual wall construction and in part due to reduced parasitic leakage, and the design is less sensitive to attachment features which operate at lower temperatures.

17 Claims, 4 Drawing Sheets

(52) U.S. Cl.
CPC ...... *F05D 2230/21* (2013.01); *F05D 2230/22* (2013.01); *F05D 2260/201* (2013.01); *F05D 2260/202* (2013.01); *F23R 2900/03041* (2013.01); *F23R 2900/03042* (2013.01); *F23R 2900/03043* (2013.01); *F23R 2900/03044* (2013.01); *Y02T 50/675* (2013.01)

(58) Field of Classification Search
CPC .. F23R 2900/03043; F23R 2900/03044; F23R 3/002; F23R 2900/03044; F23R 2900/03041; F23R 2900/00018; Y02T 50/675; F23M 5/08; F23M 5/085; F05D 2260/202; F05D 2260/201; F05D 2260/221; F05D 2260/22141; F05D 2230/21; F05D 2230/22
See application file for complete search history.

(56) References Cited

U.S. PATENT DOCUMENTS

| | | | |
|---|---|---|---|
| 4,312,186 A * | 1/1982 | Reider | F23R 3/002 60/754 |
| 4,751,962 A * | 6/1988 | Havekost | F23R 3/002 165/300 |
| 5,027,604 A * | 7/1991 | Krueger | F01D 5/187 415/9 |
| 5,195,243 A * | 3/1993 | Junod | C23C 4/185 29/460 |
| 5,363,654 A * | 11/1994 | Lee | F23R 3/002 165/908 |
| 5,528,904 A * | 6/1996 | Jones | F01D 5/288 60/753 |
| 5,655,361 A * | 8/1997 | Kishi | F02K 1/827 181/222 |
| 6,341,485 B1 * | 1/2002 | Liebe | F23R 3/002 60/772 |
| 6,408,628 B1 * | 6/2002 | Pidcock | F23R 3/002 60/752 |
| 6,701,714 B2 * | 3/2004 | Burd | F23M 5/02 60/752 |
| 6,708,499 B2 | 3/2004 | Pidcock et al. | |
| 6,725,666 B2 | 4/2004 | Tiemann | |
| 6,857,275 B2 | 2/2005 | Pidcock et al. | |
| 6,901,757 B2 | 6/2005 | Gerendas | |
| 7,000,397 B2 | 2/2006 | Pidcock et al. | |
| 7,093,439 B2 | 8/2006 | Pacheco-Tougas et al. | |
| 7,140,185 B2 * | 11/2006 | Burd | F23M 5/085 60/752 |
| 7,146,815 B2 | 12/2006 | Burd | |
| 7,219,498 B2 | 5/2007 | Hadder | |
| 7,464,554 B2 | 12/2008 | Cheung et al. | |
| 7,886,541 B2 | 2/2011 | Woolford et al. | |
| 7,905,094 B2 | 3/2011 | Dudebout et al. | |
| 7,926,278 B2 | 4/2011 | Gerendas et al. | |
| 7,942,004 B2 | 5/2011 | Hodder | |
| 7,954,325 B2 | 6/2011 | Burd et al. | |
| 8,015,829 B2 | 9/2011 | Coughlan, III et al. | |
| 8,024,933 B2 | 9/2011 | Woolford et al. | |
| 8,099,961 B2 | 1/2012 | Gerendas | |
| 8,113,004 B2 | 2/2012 | Carlisle et al. | |
| 8,490,399 B2 * | 7/2013 | Nordlund | F23R 3/005 60/752 |
| 9,057,523 B2 * | 6/2015 | Cunha | F23R 3/002 |
| 2003/0145604 A1 * | 8/2003 | Pidcock | F23R 3/002 60/796 |
| 2004/0221941 A1 * | 11/2004 | Bouillon | B28B 1/44 156/155 |
| 2006/0005543 A1 * | 1/2006 | Burd | F23M 5/085 60/752 |
| 2006/0053798 A1 * | 3/2006 | Hadder | F23R 3/007 60/772 |
| 2006/0207259 A1 * | 9/2006 | Holt | F23M 5/085 60/772 |
| 2007/0193216 A1 * | 8/2007 | Woolford | F23R 3/002 52/782.1 |
| 2008/0127652 A1 * | 6/2008 | Putz | F23R 3/005 60/752 |
| 2010/0011775 A1 | 1/2010 | Garry et al. | |
| 2010/0095680 A1 | 4/2010 | Rudrapatna et al. | |
| 2011/0023495 A1 | 2/2011 | Bronson et al. | |
| 2011/0030378 A1 * | 2/2011 | Carlisle | F23R 3/002 60/753 |
| 2011/0126543 A1 | 6/2011 | Kirsopp et al. | |
| 2011/0185739 A1 | 8/2011 | Bronson et al. | |
| 2012/0073306 A1 * | 3/2012 | Habarou | F23R 3/002 60/796 |
| 2012/0204727 A1 * | 8/2012 | Nordlund | F23R 3/005 96/221 |
| 2013/0025287 A1 * | 1/2013 | Cunha | F23R 3/002 60/772 |
| 2013/0025288 A1 * | 1/2013 | Cunha | F23R 3/002 60/772 |
| 2014/0216042 A1 * | 8/2014 | Hanson | F23R 3/06 60/754 |
| 2015/0013340 A1 * | 1/2015 | Pinnick | F23R 3/002 60/754 |

* cited by examiner

DUAL-WALL IMPINGEMENT, CONVECTION, EFFUSION COMBUSTOR TILE

CROSS-REFERENCE TO RELATED APPLICATIONS

This application claims priority to U.S. Provisional Patent Application No. 61/773,082, filed Mar. 5, 2013, the contents of which are hereby incorporated in their entirety.

FIELD OF TECHNOLOGY

A gas turbine engine uses a combustor and a combustor liner, and more particularly, a liner having wall elements to form a dual wall cooling system.

BACKGROUND

Gas turbine engines are used extensively in high performance aircraft and they employ fans, compressors, combustors and turbines and during operation they generate energies and air flows that impact the performance of the engine's systems. A gas turbine may employ one or more combustors that serve as the fuel preparation and ignition chambers for generating the temperature rise which is required to drive the turbine blades. Typical combustors may use inner and outer liners that define an annular combustion chamber in which the fuel and air mixtures are combusted. The inner and outer liners are radially offset from the combustor casings such that inner and outer passage ways are defined between the respective inner and outer liners and casings.

In order to improve the thrust and fuel consumption of gas turbine engines, i.e., the thermal efficiency, it is necessary to use high compressor exit pressures and combustion exit temperatures. Higher compressor pressures also give rise to higher compressor exit temperatures supplied to the combustion chamber, which results in a combustor chamber experiencing much higher temperatures than are present in most conventional combustor designs.

A need exists to provide effective cooling of the combustion chamber walls. Various cooling methods have been proposed including the provision of a doubled walled combustion chamber whereby cooling air is directed into a gap between spaced outer and inner walls, thus cooling the inner wall. This air is then exhausted into the combustion chamber through apertures in the inner wall. The inner wall may be comprised of a number of heat resistant tiles.

Combustion chamber walls which comprise two or more layers are advantageous in that they only require a relatively small flow of air to achieve adequate wall cooling. However, hot spots may form in certain areas of the combustion chamber wall. This problem is heightened as temperatures within the combustion chamber which can exceed 3,500 degrees F. Such harsh environmental conditions may prematurely reduce the life of the liner of the combustor. In addition, loss of tile attachment and subsequent component distress remains an engineering challenge in current combustor technology.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

A gas turbine engine combustor tile design includes an exemplary high temperature capable dual wall combustor tile attached to a lower temperature capable cold skin of a combustor liner. The wall cooling is accomplished by feeding air through holes in the cold skin. The air impinges on the back side of the hot tile and then flows out ejection slots or holes into the hot flow path. The gap formed between the cold skin and the tile hot side surface forms a cooling channel which may be enhanced by the presence of turbulators or pin fins. This interface gap is maintained by pulling the hot tile into the cold skin via attachment features such as studs. Standoffs on the back side of the tile land against the cold skin and react against the fastener preload in order to maintain position of the tiles during engine operation.

The exemplary tile assembly 42 is a dual-wall impingement, convection, effusion combustor tile and method of constructing a tile which offers significant benefit over conventional combustor wall cooling systems in terms of temperature capability and cooling flow requirements. The embodiment disclosed herein blends the technology of a tiled combustor liner with an integral dual wall cooling system to form a novel tile assembly.

Figure 1:
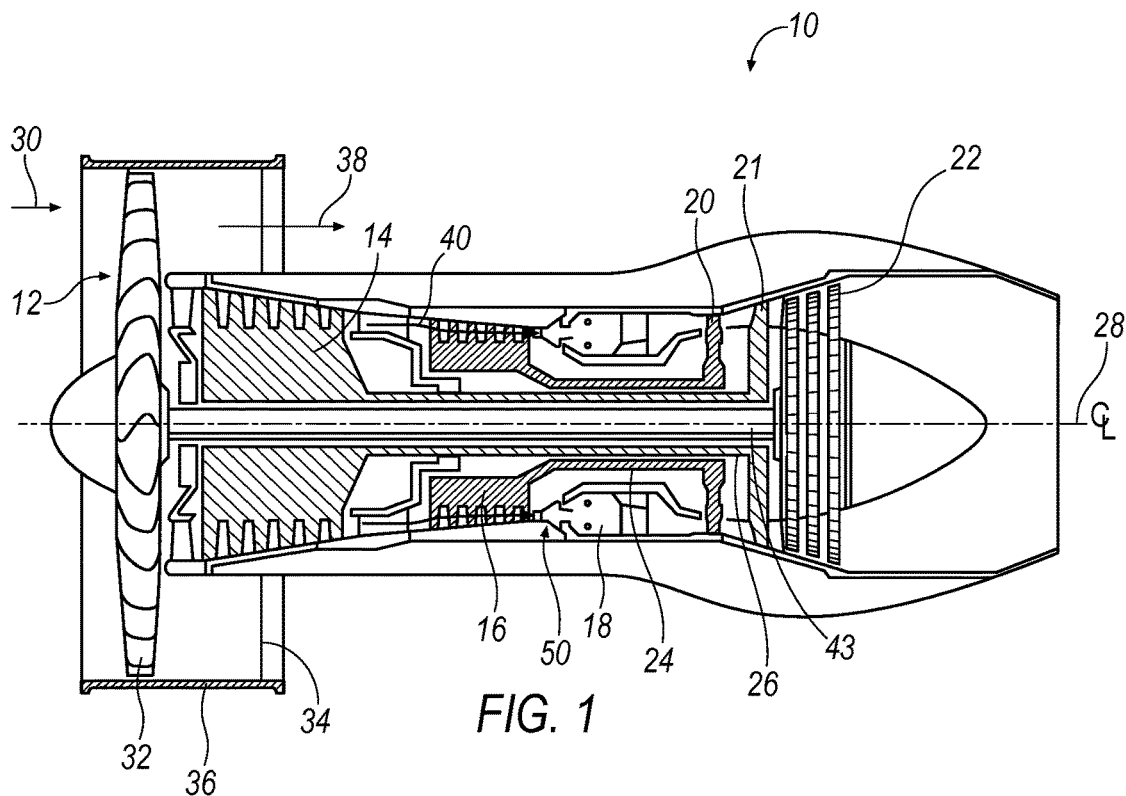
FIG. 1 illustrates a schematic diagram of a gas turbine engine employing an improved combustor assembly.

FIG. 1 illustrates a gas turbine engine 10, which includes a fan 12, a low pressure compressor and a high pressure compressor, 14 and 16, a combustor 18, and a high pressure turbine, intermediate pressure, and low pressure turbine, 20 thru 22, respectively. The high pressure compressor 16 is connected to a first rotor shaft 24, the low pressure compressor 14 is connected to a second rotor shaft 26, and the fan 12 is connected to a third rotor shaft 43. The shafts extend axially and are parallel to a longitudinal center line axis 28. It will be appreciated that the improvements disclosed herein can be used with gas turbine engines that incorporate a single or two-shaft architecture.

Ambient air 30 enters the fan 12 and is directed across a fan rotor 32 in an annular duct 34, which in part is circumscribed by fan case 36. The bypass airflow 38 provides engine thrust while the primary gas stream 40 is directed to the compressors 14 and 16, combustor 18, and the turbines 20 thru 22. The gas turbine engine 10 includes an improved combustor 18 having a tile assembly 42, the details of the exemplary design are set forth herein.

Figure 2:
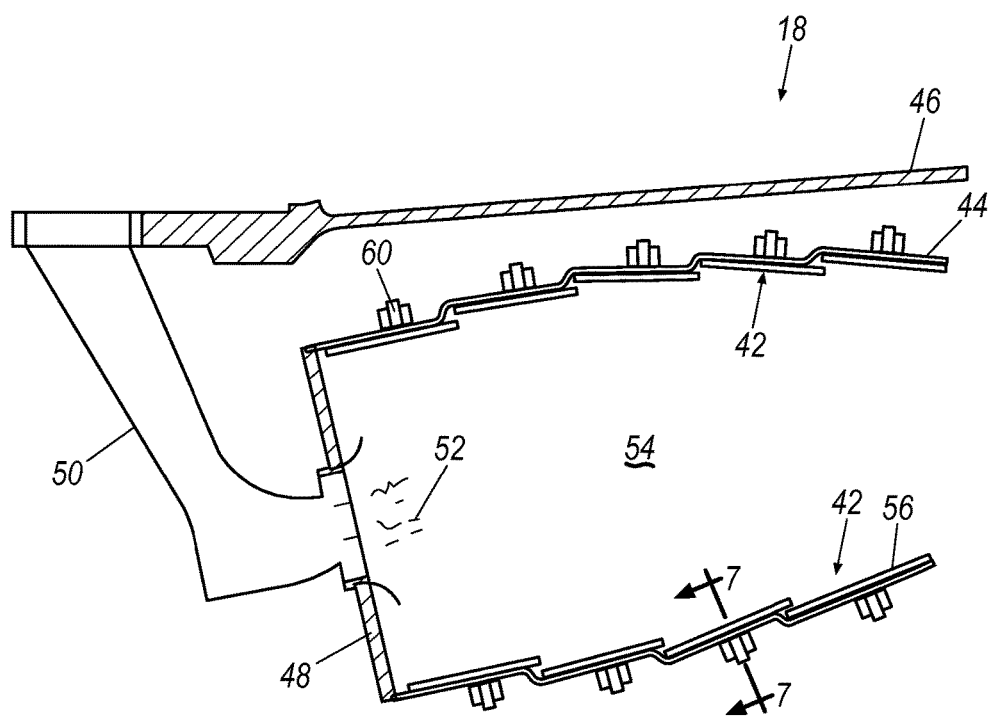
FIG. 2 illustrates a side sectional view of a gas turbine engine with an improved tiled combustor assembly.

FIG. 2 illustrates a side sectional view of the combustor 18 with a plurality of tile assemblies 42 that are secured to a cold skin or outer surface of a liner 44. A combustor outer case 46 circumscribes a combustor shell 48 and a fuel nozzle 50 provides pressurized fuel 52 to a combustor chamber 54. The combusted fuel may be ignited by an igniter (not shown) which in turn subjects the chamber 54 to elevated temperatures which can exceed 3,500 degrees F. Such arrangement causes extreme temperatures to impinge upon the hot surface 56 of each tile assembly 42. A fastener 60 secures each tile assembly 42 to the liner 44 of the combustor 18. The tile assembly 42 is serviceable and may be replaced when it is damaged or is otherwise sufficiently depleted in performance quality.

Figure 3:
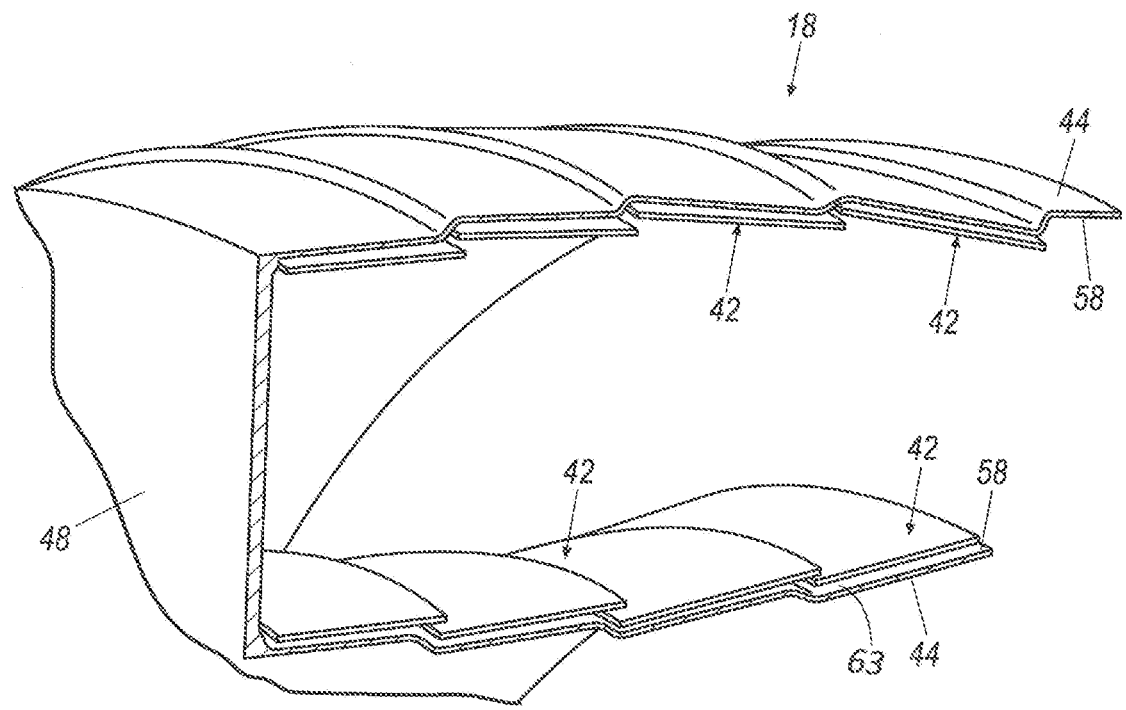
FIG. 3 illustrates a partial perspective sectional view of a gas turbine engine with a tiled combustor assembly.

FIG. 3 illustrates the shell 48 of the combustor 18 having a plurality of tile assemblies 42 spaced apart and secured to the inner surface 58 of the skin 44. The inner surface 58 is protected by the tile assembly 42 at substantially the entire inner surface 58 of the skin 44. A gap 63 is maintained between the inner surface 58 and the assembly 42. The cooling effectiveness of each dual wall tile assembly 42 does not rely on accurately maintaining the gap 63 between the tile standoff features and the cold skin 44, as is the case for conventional tiles. In addition, the tile attachment feature or fastener 63 will be maintained at a lower temperature as compared to a conventional tile system. This arrangement results in a robust mechanical attachment that resists creep and loss of preload, both of which translate into improved component reliability/durability and reduced parasitic leakage. Parasitic leakage which bypasses the cooling circuit translates into lower overall cooling effectiveness.

Reduced combustor wall cooling translates into a competitive advantage in term of combustor pattern factor control, radial temperature profile control, efficiency, and emissions reduction. The integral dual wall metallic combustor tile assembly 42 offers significant advantages over conventional tiles including but not limited to a reduction in wall cooling flow, a cooler tile attachment (improved reliability/durability), reduced tile leakage and the associated penalty in cooling effectiveness due to leakage, and a more robust mechanical design in terms of less sensitivity to cold skin and tile geometric tolerances/operating deflections.

Figure 4:
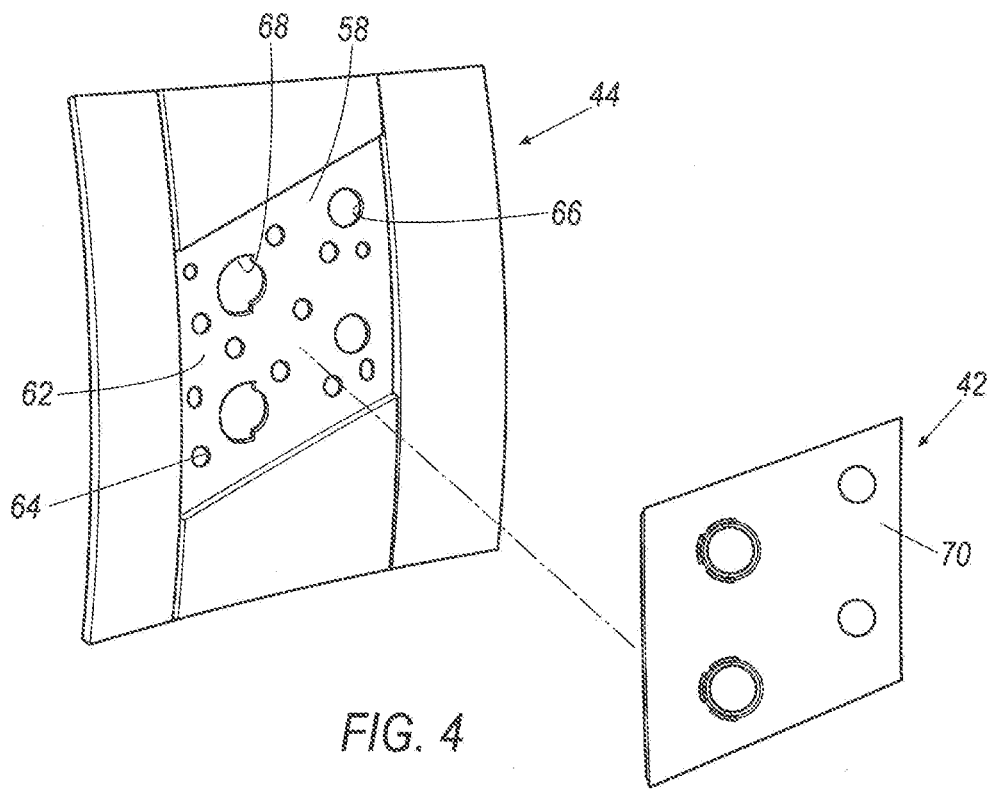
FIG. 4 illustrates a partial sectional view of a combustor assembly showing the installation of a DICE tile.

FIG. 4 illustrates a cut away of the combustor 18 showing one tile assembly 42 shown offset from the cold skin inner surface 58 of a combustor 18. A tile mounting surface 62 on the cold skin inner surface 58 provides a mounting space for receiving each tile assembly 42. The tile assembly 42 is shown offset from the surface 62 for illustrative purposes. The tile mounting surface 62 has substantially the same profile as the profile of the tile assembly 42. The mounting surface 62 has a plurality of apertures 64 for providing cooling air flow. Small and large dilution ports, 66 and 68, provide large airflow passageways through the skin 44. Surface 70 of the tile assembly 42 represents the hot side of the tile which is subjected to extreme heat conditions.

Figure 5:
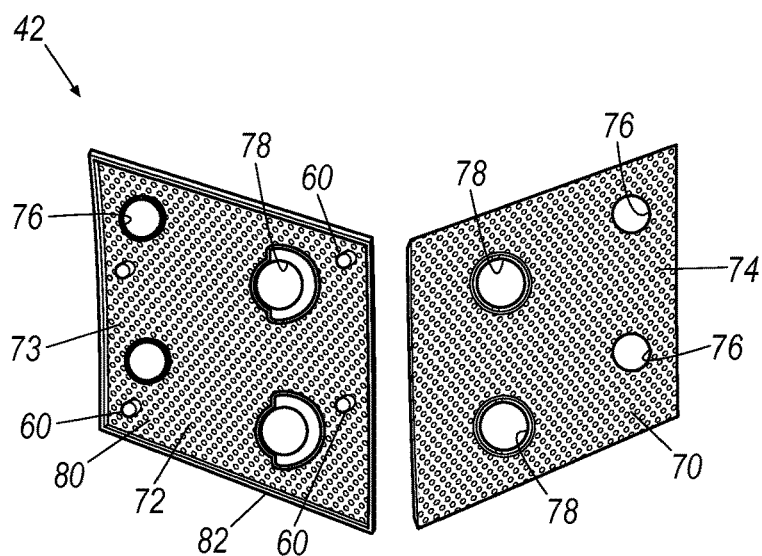
FIG. 5 illustrates a perspective view a Dual-Wall Impingement, Convection, Effusion (DICE) combustor tile, showing the hot side and a cold side.

FIG. 5 illustrates an exploded view showing a first wall or cold side 72 and a second wall or hot side 70 of the tile assembly 42. The walls 70 and 72 may be substantially planar or of high curvature in configuration. The cold side 72 and the hot side 70 are shown split apart for illustration purposes only. The hot side 70 represents a front side of the assembly 42 and the cold side 72 represents a back side of the assembly 42. The assembly 42 could be constructed from metal or a composite ceramic material.

The hot side 70 includes cooling exit holes or slots 74, small dilutions holes 76, and large dilution holes 78. The cold side 72 of the tile assembly 42 includes cooling entry holes 73, and co-aligned small dilution ports 76 and large dilution ports 78. . The hot side of the tile assembly 42 also includes a plurality of cooling exit holes 74. A plurality of threaded studs or fasteners 60 extend from a surface 80 of the first wall 72. A rail or lip 82 protrudes from the surface 80 around the perimeter of the first wall 72 and is rhombus shaped but other shapes are contemplated. The rail 82 may be integral with the surface 80. A surface of the rail 82 impinges upon the inner surface 58 of the cold skin 44. The rail creates a plenum 92 to feed the cooling holes 74 and operates to create an offset from a surface of the cold skin.

Figure 6:
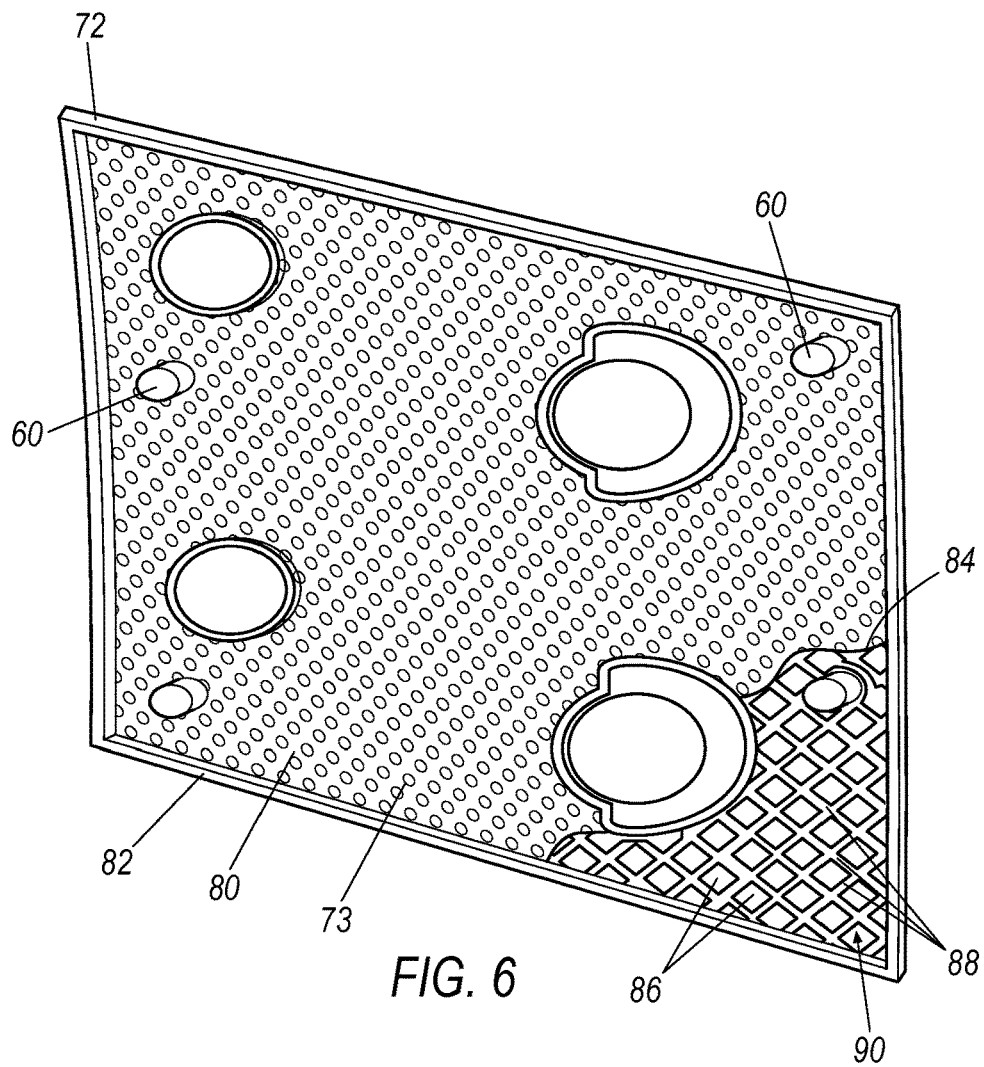
FIG. 6 illustrates an enlarged perspective view of the cold side of the DICE tile, showing a cut away depicting the pedestals and air channels.

FIG. 6 illustrates an enlarged perspective view of the first wall or cold side 72 which is the cold side of the assembly 42. A cut away section 84 is depicted in the lower portion of FIG. 6 which illustrates, under the outer surface 80, a plurality of square-shaped pedestals 86 that are offset by air channels 88. The pedestal pattern 90 consisting of the pedestals 86 and air channels 88 shown is exemplary in nature and other geometric configurations are contemplated. The pattern 90 extends underneath substantially the entire surface 80 and provides air flow channels 88 for aiding cooler air distribution about the first and second walls 70 and 72.

Figure 7:
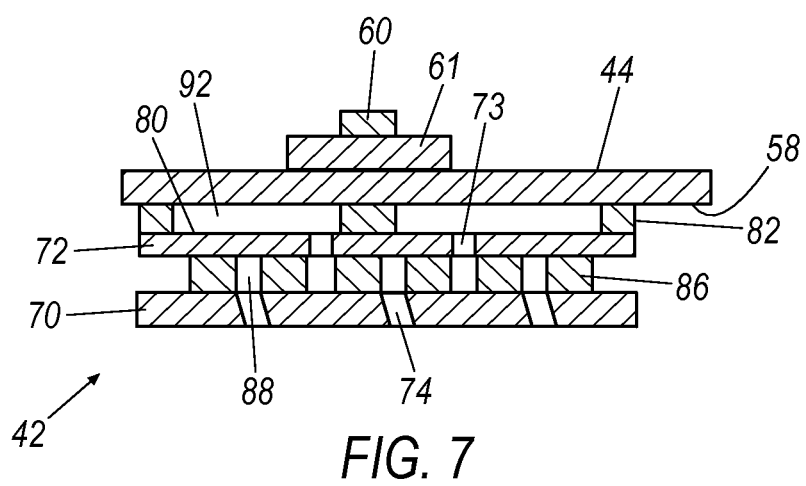
FIG. 7 illustrates an enlarged side cross-sectional view of a DICE tile assembly for use in a combustor of a gas turbine engine.

FIG. 7 illustrates a cross-sectional view taken from line 7-7 of FIG. 2, depicting a tile assembly 42 secured to a cold skin 44. The tile assembly 42 may be constructed primarily of a composite ceramic material (CMC), but other configurations could include a metallic two-piece diffusion or braze bonded assembly of cast, wrought, or direct metal laser sintered (a/k/a direct laser deposition or additive manufactured) components, or a single piece cast or direct metal laser sintered tile. The tile's hot surface can either be as manufactured or can have a thermal and/or environmental barrier coating applied. The coating could be ceramic. The cross-section that is shown in FIG. 7 includes a stud 60 extending through the cold skin 44 of the combustor. A nut or other anchor 61 can be provided as well so as to provide a mechanical securing mechanism for attaching each assembly 42 to the skin 44. The cool side of the DICE tile assembly 42 has a rail 82 upwardly impinging upon the underside 58 of the cold skin 44, thus creating a plenum 92. The wall of the cold side 72 is offset from the wall 70 of the hot side by pedestals 86, the distance of which can be modified to enhance air channel 88 capacities and volumes. Normal, angled, and/or shaped cooling holes 74 may extend from the air channels 88, through the hot side wall 72, and then into the interior 54 of the combustion chamber 18.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

What is claimed is:

1. A gas turbine engine having a combustor comprising:
   a liner having an inner surface, the inner surface having a plurality of arcuately shaped surfaces;
   a plurality of tile assemblies, each tile assembly including a first wall element and a second wall element spaced radially from the first wall element, the plurality of tile assemblies secured to the inner surface of the liner, each tile assembly forming a cooling plenum between the inner surface of the liner and the first wall element;

a plurality of pedestal members positioned between the first wall element and the second wall element, such that an interconnected plurality of air channels is formed between the first wall element and the second wall element in each tile assembly; and at least one securing member for securing each tile assembly to the liner;

wherein the first wall element includes a plurality of cooling entry holes that are arranged on the first wall element in a first array comprising multiple rows of the cooling entry holes, and the second wall element includes a plurality of exit holes that are arranged on the second wall element in a second array comprising multiple rows of the exit holes, wherein the cooling plenum feeds each tile assembly by passing air orthogonally from the cooling plenum through the plurality of cooling entry holes and to the interconnected plurality of air channels between the first wall element and the second wall element, and through the plurality of exit holes; and a rail formed on each tile assembly and extending around the outer perimeter of each tile assembly, the rail extending from the first wall element and engaging the inner surface of the liner to form the cooling plenum of each tile assembly;

wherein each tile assembly of the plurality of tile assemblies is formed as a single piece tile;

wherein a first tile assembly of the plurality of tile assemblies is positioned on a first surface of the plurality of arcuately shaped surfaces, and a second tile assembly of the plurality of tile assemblies is positioned on a second surface of the arcuately shaped surfaces adjacent to and radially offset from the first surface, such that a first edge of the first tile assembly is positioned proximate a second edge of the second tile assembly and the first edge and the second edge are radially offset from each other forming a radial gap.

2. The gas turbine as claimed in claim 1, wherein each tile assembly is formed of a ceramic composite material.

3. The gas turbine as claimed in claim 1, wherein each tile assembly is formed of a metallic material.

4. The gas turbine as claimed in claim 1, wherein each tile assembly of the plurality of tile assemblies includes the first wall element formed as a first substantially planar or curved member, the second wall element formed respectively as a second substantially planar or curved member, wherein the plurality of pedestal members form spacers for offsetting said first substantially planar or curved member from said second substantially planar or curved member, and the plurality of cooling entry holes, the interconnected plurality of air channels and the plurality of exit holes forming a cooling flow path through each tile assembly.

5. The gas turbine as claimed in claim 4, wherein the at least one securing member is connected to one of the first substantially planar or curved member and the second substantially planar or curved member.

6. The gas turbine as claimed in claim 1, wherein each tile assembly includes a plurality of securing members.

7. The gas turbine as claimed in claim 1, wherein each tile assembly is formed as a ceramic member.

8. The gas turbine as claimed in claim 1, wherein each of said first wall element and second wall element of each tile assembly includes a small dilution port and/or a large dilution port.

9. The gas turbine as claimed in claim 1, wherein the liner has a tile mounting surface formed on the inner surface, and the tile mounting surface includes cooling ports that permit air flow to the plurality of tile assemblies.

10. The gas turbine as claimed in claim 1, wherein the at least one securing member further comprises a mounting stud passing through the liner and secured at one end to one of the first wall element and second wall element, the mounting stud secured at another end to a wall of the liner.

11. The gas turbine as claimed in claim 1, wherein the single piece tile is a single piece cast tile.

12. The gas turbine as claimed in claim 1, wherein the single piece tile is a direct metal laser sintered tile.

13. The gas turbine as claimed in claim 1, wherein the plurality of pedestal members are positioned between each of the first wall element and the second wall element.

14. The gas turbine as claimed in claim 1, wherein each pedestal member of the plurality of pedestal members is square-shaped.

15. The gas turbine as claimed in claim 1, wherein each exit hole of the plurality of exit holes is non-normally angled with respect to a surface of the second wall element.

16. The gas turbine as claimed in claim 1, wherein the plurality of pedestal members is a two-dimensional array of pedestals arranged in a pattern forming the interconnected plurality of air channels, the two-dimensional array of pedestals forming multiple rows of pedestals positioned side-by-side and extending in a first direction, and forming multiple rows of pedestals positioned side-by-side and extending in a second direction that is approximately orthogonal to the first direction.

17. The gas turbine as claimed in claim 1, wherein the first surface and the second surface are stepped forming a stepped location between the first surface and the second surface, and the first edge and the second edge are proximate the stepped location such that the radial gap is formed at the stepped location.

* * * * *